(12) United States Patent
Benedetti

(10) Patent No.: US 6,824,197 B2
(45) Date of Patent: Nov. 30, 2004

(54) PANEL RETENTION DEVICE

(75) Inventor: Steven Michael Benedetti, Sterling Heights, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/393,199

(22) Filed: Mar. 20, 2003

(65) Prior Publication Data

US 2004/0183333 A1 Sep. 23, 2004

(51) Int. Cl.$^7$ ................................................. B60J 1/10
(52) U.S. Cl. ............................. 296/146.15; 296/96.21; 296/146.16; 296/93; 52/204.591
(58) Field of Search ............................. 296/146.15, 36, 296/148, 146.3, 96.21, 201, 146.16, 93; 52/208, 204.591, 204.597, 202, 770

(56) References Cited

U.S. PATENT DOCUMENTS

| | | | | |
|---|---|---|---|---|
| 4,135,277 A | * | 1/1979 | Taniai et al. ............. | 296/96.21 |
| 4,262,960 A | | 4/1981 | Fifer | |
| 4,700,525 A | * | 10/1987 | Nieboer et al. ......... | 52/204.591 |
| 4,712,341 A | * | 12/1987 | Harris, Jr. et al. ....... | 296/96.21 |
| 4,841,698 A | | 6/1989 | Gold | |
| 4,864,786 A | | 9/1989 | Harris, Jr. | |
| 4,951,907 A | * | 8/1990 | Gold ...................... | 296/146.15 |
| 4,986,595 A | | 1/1991 | Gold | |
| 5,475,956 A | * | 12/1995 | Agrawal et al. ......... | 296/96.21 |
| 5,516,183 A | * | 5/1996 | Gold ...................... | 296/146.15 |
| 5,695,236 A | * | 12/1997 | Banno et al. ............ | 296/96.21 |
| 5,740,640 A | * | 4/1998 | Yasuda ................... | 296/146.16 |
| 6,179,940 B1 | * | 1/2001 | Escobar-Y-Gamboa et al. .. | 296/93 |
| 6,224,136 B1 | * | 5/2001 | Takagi ................... | 296/146.15 |

FOREIGN PATENT DOCUMENTS

| | | | |
|---|---|---|---|
| JP | 357080918 | * | 5/1982 |
| JP | 359089214 | * | 5/1984 |
| JP | 360124518 | * | 7/1985 |

OTHER PUBLICATIONS

Five (5) photographs of window retainers (believed to have been offered for sale or publicly used in U.S. prior to Mar. 20, 2003).

One (1) photograph of A/C secondary coupling device (believed to have been offered for sale or publicly used in U.S. prior to Mar. 20, 2003).

* cited by examiner

Primary Examiner—Kiran Patel
(74) Attorney, Agent, or Firm—Harness, Dickey & Pierce, P.L.C.

(57) ABSTRACT

In accordance with the present invention, a preferred embodiment of a panel retention device is provided. A further aspect of the present invention includes a base portion having a rib extending from less than an entirety of a periphery of a first surface to define an open recess. In another aspect of the present invention, the retention device has a pivot axis defining an elongated center of a torsion bar.

20 Claims, 4 Drawing Sheets

PANEL RETENTION DEVICE

BACKGROUND OF THE INVENTION

The present invention generally relates to a panel retention device and more particularly to a retainer used with a window in an automobile.

Fixed window assemblies are commonly found in modern automobiles. Fixed window assemblies generally include a fixed window panel that is secured within an aperture defined by a sheet metal frame in the motor vehicle body. The window panel typically sits flush with an exterior body panel of the automobile to provide the vehicle with a sleek appearance and an aerodynamic exterior surface. The window panel is permanently secured within the frame using a suitable sealant, such as urethane bead.

During installation of the fixed window panel at least one fastener commonly taking the form of a retention clip is used to temporarily support the window panel within the frame before the permanent sealant, preferably applied before the window is positioned in the frame, solidifies. The retention clip is typically secured directly to the window panel with an adhesive. Upon insertion of the window panel within the frame, the clip makes contact with the frame. It is this contact between the clip and the frame that temporarily supports the window panel within the frame before the permanent sealant solidifies.

One example of a conventional retention clip is disclosed in U.S. Pat. No. 4,712,341 entitled "Modular Window Assembly Clip," which issued to Harris Jr. et al. on Dec. 15, 1987. The Harris Jr. et al, reference discloses a clip for positioning a modular window assembly within a body aperture. The Harris Jr. et al. reference is incorporated by reference herein. Many such conventional retention clips fail to include an feature that aids the positioning of the window panel at a desired distance from the window frame, fail to include a base portion that can channel excessive adhesive away from the location of the permanent sealant to prevent contamination of the sealant, fail to include a retention member that transfers a biasing force to the window frame to retain the window within the frame, fail to provide retention members that permit the clip to engage frames of different sizes, fail to include retention members that are designed to both relieve the retention members of stress and to make flexing of the retention members more predictable and constant, fail to include retention members that facilitate installation of the retention clip within the window panel, and fail to provide retention members with a stop feature to retain the window panel within the frame.

SUMMARY OF THE INVENTION

In accordance with the present invention, a preferred embodiment of a panel retention device is provided. A further aspect of the present invention includes a base portion having a rib extending from less than an entirety of a periphery of a first surface to define an open recess. In another aspect of the present invention, the retention device has a pivot axis defining an elongated center of a torsion bar. In a further aspect of the present invention, the retention device has two retention wings of different lengths. Still another aspect of the invention provides for a window retention device having a base portion, a support portion, at least two wing portions each having a concave outer surface, a lower surface, and a base surface. Yet another aspect of the invention provides for a retention device with a single contact point between the device and a frame for transferring a biasing force to a panel that retains the panel within the frame. Still a further aspect of the invention provides for a retention device having spacers that offset the retention device from a frame. Finally, the present invention also provides for a method for retaining a panel in a frame having at least the steps of securing a retention device to the panel, inserting the panel within the frame, and using the retention device to retain the panel within the frame.

The retention device of the present invention is advantageous over conventional retention clips in that the present invention provides an open recess that channels adhesive used to secure the device to a panel away from a sealant that permanently secures the panel to a frame. The present invention also enhances the robustness of such a device by providing a rotational pivot axis that eliminates undesirable stretching or compression of winged retention portions of the device, thereby minimizing premature fracture and fatigue. Further, the present invention uses spacers to permit the positioning of a panel attached to the retention device at a set distance from a frame. Also, the present invention makes the installation of the retention device easier by providing winged retention portions with concave outer surfaces. Still further, the present invention biases the retention device within the frame due to interaction between substantially planar bearing surfaces of the winged retention portions and a sheet metal portion of the frame. Finally, the present invention provides for a device having winged retention portions of different lengths to adapt the device for use with frames of different sizes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
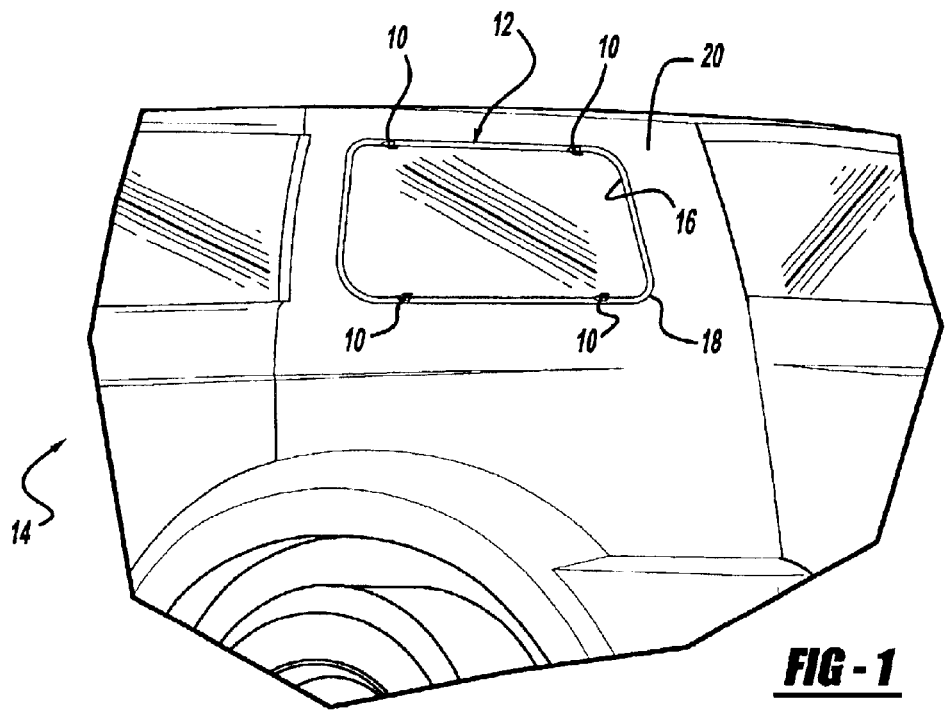
FIG. 1 is a perspective view showing a rear side portion of a motor vehicle employing a panel retention device according to a preferred embodiment of the present invention.
Figure 2:
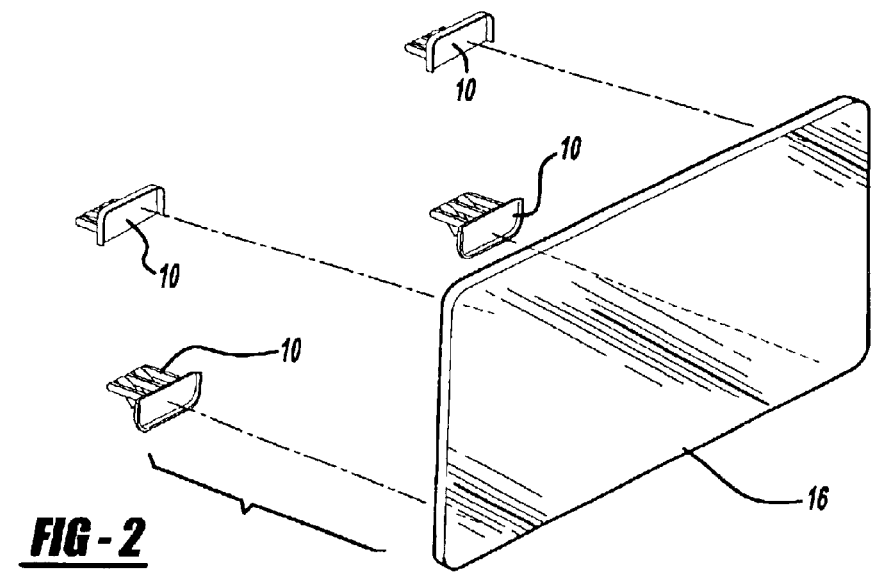
FIG. 2 is an exploded perspective view of the preferred embodiment retention device and a window panel.

The following description of the preferred embodiment is merely exemplary in nature and is in no way intended to limit the invention, its application, or uses. FIGS. 1 and 2 show a plurality of panel retention devices or clips 10 according to the preferred embodiment of the present invention employed in a side, rear fixed window assembly 12 of an automobile 14. In addition to retention clip 10, window assembly 12 includes a window panel 16 and a window frame 18. Window frame 18 is a pinch weld flange slightly recessed within a sheet steel, external body panel 20 of automobile 14. Window panel 16 is secured within the window frame 18 such that the window 16 is at least substantially flush with the external body panel 20. The window 16 is secured within the frame 18 using a suitable sealant 22 (FIGS. 5 through 7), such as a robotically extruded urethane bead, that prevents the passage of air and moisture through the window assembly 12. During the installation of the window 16, the retention clip 10 temporarily retains the window 16 within the frame 18 until the sealant 22 solidifies.

Figure 3:
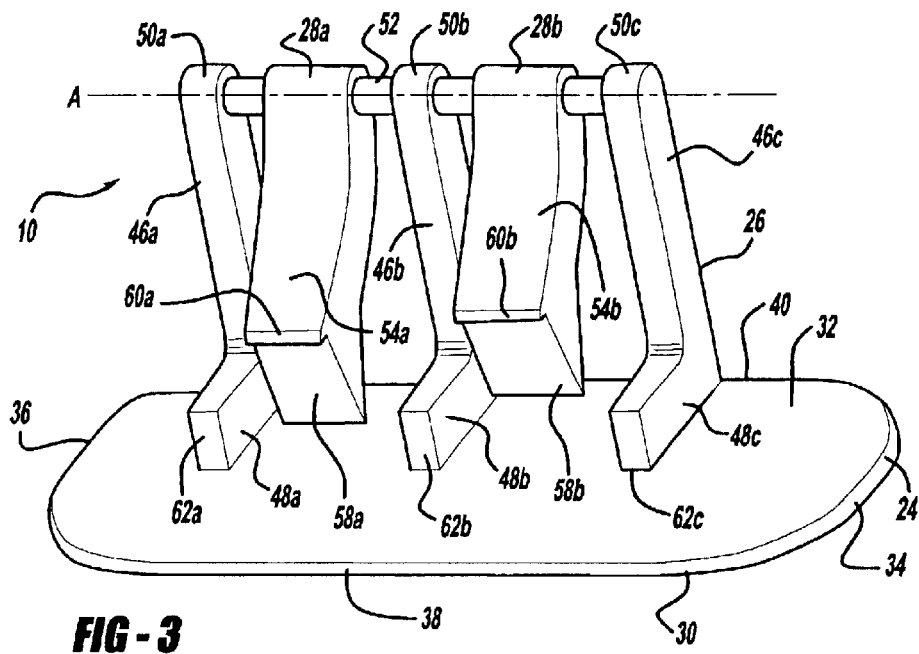
FIG. 3 is a perspective view of the panel retention device in accordance with a preferred embodiment of the present invention.
Figure 4:
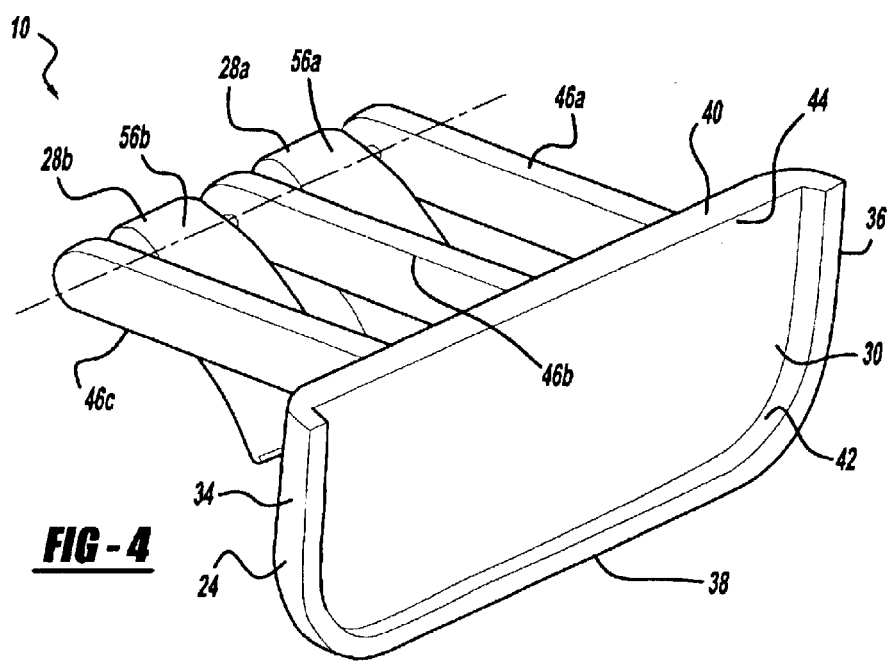
FIG. 4 is a perspective view generally opposite that of FIG. 3 showing the preferred embodiment panel retention device.

With specific reference to FIGS. 3 and 4, the retention clip 10 generally includes a base 24, a support assembly 26, a first retaining wing 28a, and a second retaining wing 28b. The base 24 is generally planar and includes a lower surface 30 and an upper surface 32. The base 24 has a substantially rectangular peripheral shape and is defined by a first side surface 34, a second side surface 36, a third side surface 38, and a fourth side surface 40. The lower surface 30 further includes a base rib 42. The base rib 42 extends from at least a majority of, but less than an entirety of, the lower surface 30 to define an open recess 44. As illustrated, the rib 42 preferably extends along the first side surface 34, the third side surface 38, and the second side surface 36, but not the fourth side surface 40.

The support assembly 26 extends from the upper surface 32 and includes three vertical supports 46a, 46b, and 46c. Each vertical support 46 is substantially identical and includes a proximal end 48a, 48b, 48c and a distal end 50a, 50b, 50c. The proximal end 48 terminates at the upper surface 32 of the base 24. The distal end 50 terminates opposite the proximal end 48. A torsion bar 52 extends between the distal end 50a of the first vertical support 46a to the distal ends 50b and 50c of the second vertical support 46b and the third vertical support 46c respectively. The torsion bar 52 may be twisted or rotated in either a clockwise or counterclockwise direction about a single axis A, which extends through an elongated center of the torsion bar 52.

The first wing 28a and the second wing 28b are both suspended from the torsion bar 52 and are thus also capable of rotating about axis A. The first wing 28a is suspended from the torsion bar 52 between the first support 46a and the second support 46b. The second wing 28b is suspended between the second support 46b and the third support 46c. The first wing 28a is substantially similar to the second wing 28b except that the first wing 28a is longer than the second wing 28b.

Each wing 28 includes an outer surface 54 (as viewed in FIG. 3), an inner surface 56 (as viewed in FIG. 3), and a bearing surface 58. The outer surface 54 has a substantially concave and arcuate configuration with the deepest portion of the outer surface 54 being located slightly closer to the torsion bar 52 than to the bearing surface 58. The bearing surface 58 is substantially planar or flat. The bearing surface 58 includes a stop 60 to prevent the wings 28 from disengaging the frame 18. The stop 60 is flush with the outer surface 54 and protrudes beyond bearing surfaces 58.

The retention clip 10 further includes a plurality of spacers 62a, 62b, and 62c. The spacers 62 project from both the upper surface 32 of the base 24 and the proximal end 48 of each vertical support 46. Preferably, the clip 10 includes three spacers with the spacers 62a and 62b positioned on either side of the first wing 28a and the spacers 62b and 62c positioned on either side of the second wing 28b. As described further below, the spacers 62 facilitate the positioning of the window 16 within the window frame 18. The location of the spacers 62 also serve to reduce fractures at the support 46- to -base 24 interface.

The retention clip 10 is a single unitary part made from a suitable engineering grade polymer, such as Lubriloy™ manufactured by General Electric Plastics. While other materials may of course be employed for manufacturing the clip 10, some of the advantages of the present invention may not be realized when such other materials are used. Further, while the clip 10 is preferably manufactured using a suitable plastic injection molding process it must be realized that other manufacturing techniques may be employed, although, again, some of the advantages of the present may not be realized when such manufacturing techniques are used.

The operation of the retention clip 10 will now be described in detail. At least one clip 10 is secured to the window 16 at a periphery of the window 16. Preferably, as seen in FIGS. 1 and 2, each of four clips 10 are secured adjacent to a respective corner of the window 16. The clip 10 is secured to the window 16 using a suitable adhesive 64 applied to the open recess 44, such as Ashland's Pliogrip® two part polyurethane adhesive system. While other materials may of course be employed in place of Pliogrip®, some of the advantages of the present invention may not be realized when such other materials are used. After the open recess 44 is filled with the adhesive 64, the clip 10 is brought into contact with the window 16 so that the adhesive 64 contacts the window 16 and secures the clip 10 to the window 16. Any excess adhesive 64 applied to the recess 44 is compressed from the recess 44 through the open fourth side surface 40. The open recess 44 not only permits excess adhesive 64 to exit the recess 44, but also directs the excess adhesive 64 away from the sealant 22 to prevent contamination of the sealant 22. To enhance the connection between the clip 10 and the window 16 the window 16 is locally heated at the point of contact between the window 16 and the clip 10. After heating the window 16 is allowed to cool for approximately three minutes while the connection between the clip 10 and the window 16 solidifies.

Figure 5:
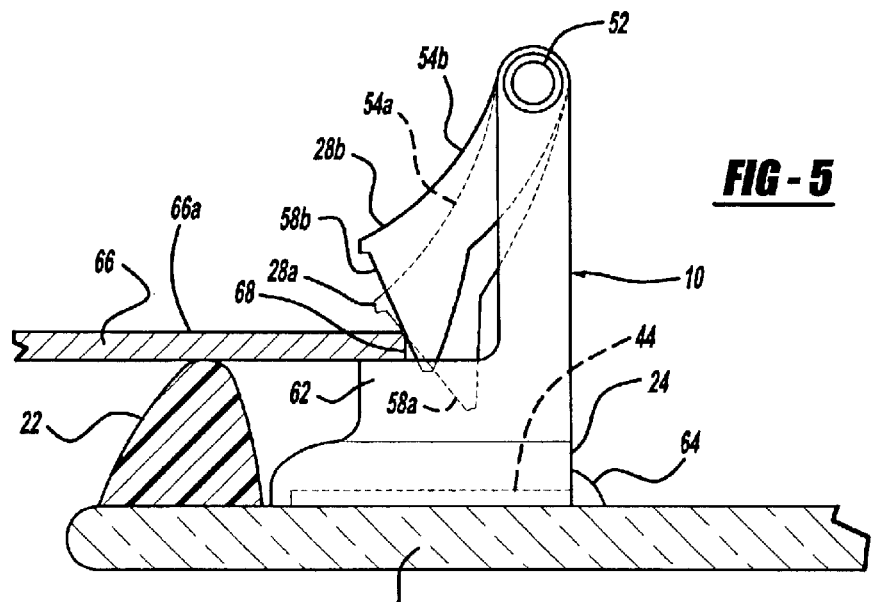
FIG. 5 is a side elevational view showing the preferred embodiment panel retention device of the present invention in a first condition.
Figure 6:
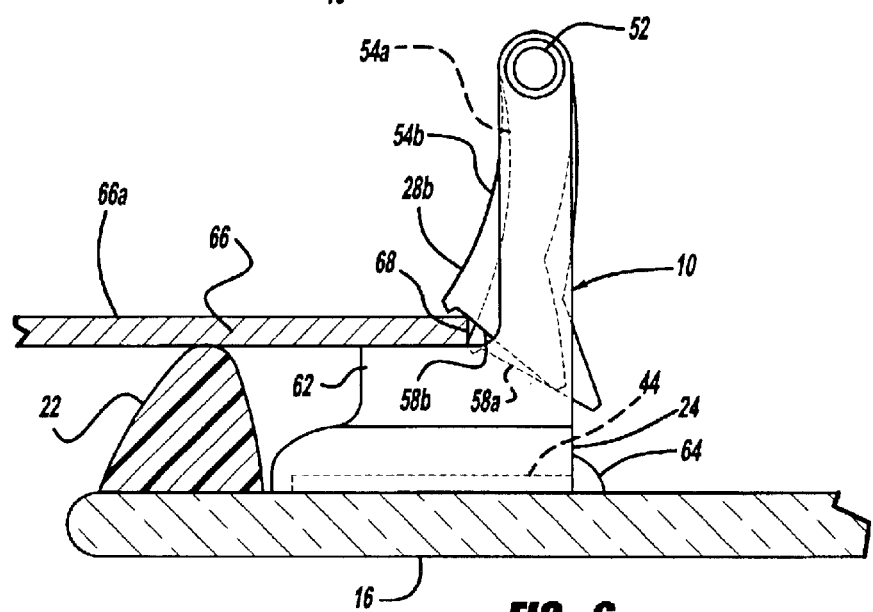
FIG. 6 is a side elevational view showing the preferred embodiment panel retention device of the present invention in a second condition.
Figure 7:
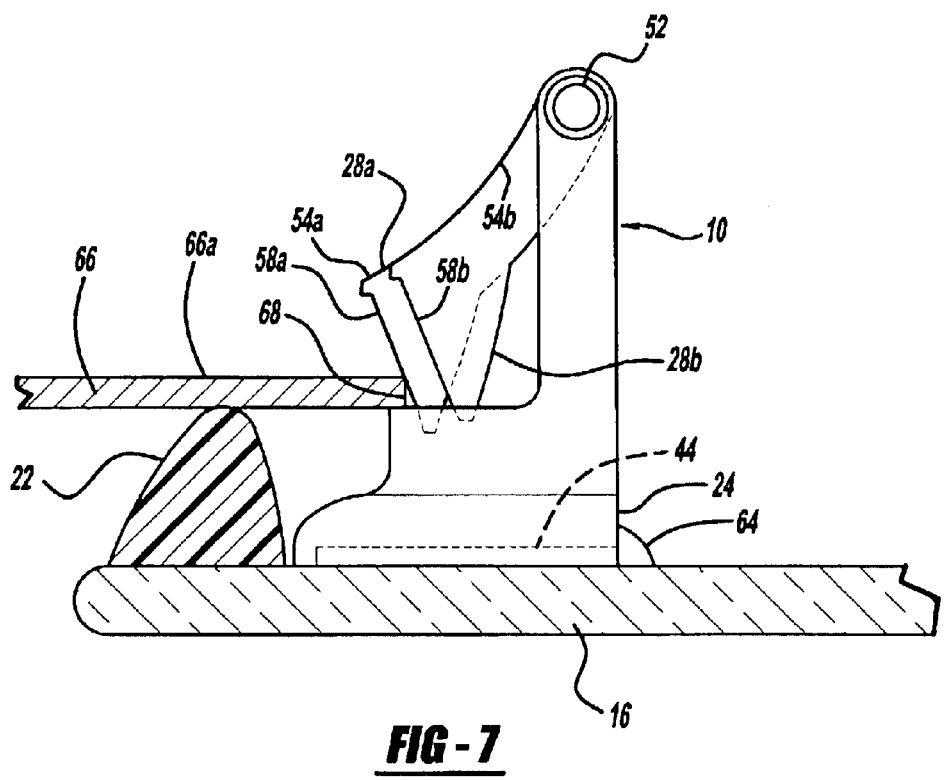
FIG. 7 is a side elevational view showing the preferred embodiment panel retention device of the present invention in a third condition.

As seen in FIGS. 5 through 7, after clips 10 are secured to the window 16, the sealant 22 is applied to the window. After the sealant 22 is applied the window 16 is robotically or manually placed within the window frame 18 such that each of the spacers 62 of the clip 10 contacts an exterior portion of a sheet metal panel 66 of the window frame 18. The spacers 62 offset the window 16 from the sheet metal 66 to assist in the proper positioning of the window 16 within the frame 18 and to accommodate the sealant 22 located between the window 16 and the sheet metal 66.

As the clip 10 is inserted within the window frame 18, before the spacers 62 of the clip 10 contact the sheet metal 66, an inside edge 68 of the sheet metal 66 initially contacts the concave outer surfaces 54 of each retaining wing 28. The concave shape of the outer surfaces 54 permits the sheet metal 66 to easily slide along the outer surfaces 54 with a low insertion effort and forces the wings 28 to rotate in a first direction about the torsion bar 52. The wings 28 continue to rotate in the first direction with increasing insertion effort until the sheet metal clears the outer surface 54 of one of, or both of, the wings 28. After the inside edge 68 of the sheet metal 66 clears the outer surface 54 of one or both of the wings 28, the cleared wing 28 rotates in a second direction opposite the first direction due to biasing of torsion bar 52 and the wings 28 toward their nominal condition such that the inside edge 68 of the sheet metal 66 contacts the bearing surface 58 of the cleared wing 28. It is this contact between the bearing surface 58 of one or both of the wings 28 that supports and centers the clip 10 and the window 16 within the frame 18.

The particular wing 28 that contacts the sheet metal 66 to support the window 16 depends on the actual size of the window frame 18 since the frame opening dimensions often vary due to tolerance variations. As seen in FIG. 5, when the window frame 18 and corresponding sheet metal 66 are of nominal size, the outer surface 54 of both wings 28 clears the sheet metal 66 and the bearing surface 58 of both wings 28 contacts the edge 68 of the sheet metal 66 to secure the window 16 within the frame 18.

As seen in FIG. 6, when the window frame opening is smaller than nominal, such that the sheet metal edge 68 extends further, only the shorter wing 28b supports the window 16. In this condition, only the shorter wing 28b provides support because only the outer surface 54b of the shorter wing 28b clears the sheet metal 66, thus permitting the bearing surface 58b of the shorter wing 28b to contact the edge 68 of the sheet metal 66. Due to the length of the longer wing 28a, the edge 68 of the sheet metal 66 is unable to clear the outer surface 54a. This prevents the bearing surface 58a from contacting the edge 68 of the sheet metal 66 and thus prevents the longer wing 28a from supporting the window 16.

In contrast, as seen in FIG. 7 when the window frame edge 68 does not extend as far as nominal, only the longer wing 28a supports the window 16. Only the longer wing 28a supports the window 16 because while the outer surface 54 of both the longer wing 28a and the shorter wing 28b will clear the edge 68 of the sheet metal 66, the shorter wing 28b is not long enough to initiate contact between its bearing surface 58b and the sheet metal 66. Only the longer wing 28a is long enough to initiate contact between the bearing surface 58a the sheet metal 66.

Each wing 28 ideally contacts the edge 68 of the sheet metal 66 at an angle of approximately 50° to best retain the window 16 within the window frame 18. The 50° angle is measured between an interior surface 66a of the sheet metal 66 and the bearing surface 58. This retention angle, coupled with the constant pressure exerted by the torsion bar 52, not only retains the clip within the window frame 18 but also produces a continuous biasing force that draws the window 16 and the clip 10 within the frame 18. This biasing force is transferred to the frame 18 at the point of contact between the bearing surface 58 and the edge 68 of the sheet metal 66. Transfer of this biasing force is aided by the planar nature of the bearing surface 58. Specifically, as the biasing force increases the bearing surface 58 slides along the edge 68 of the sheet metal 66 such that the contact point between the wing 28 and the sheet metal 66 moves away from the stop 60 to further secure the wing 28, clip 10, and window 16 within the frame 18. Thus, the biasing force may be transferred to the sheet metal 66 at any point along the bearing surface 58.

Use of the torsion bar 52 locates the pivot point A at the outermost portion of the distal end 50 of the supports 46. Positioning the pivot point A at the distal end 50, as far as possible from the bearing surface 58, makes the wings 28 more flexible, thus making it easier to pass the outer surfaces 54 of the wings 28 over the sheet metal 66. Moving the pivot point A to this location makes the wings 28 easier to flex during installation because the interaction between the bearing surface 58 and the inside edge 68 generates a greater amount of leverage upon the wings 28 when the pivot point A is in this position.

The use of the torsion bar 52 also enhances the effectiveness of the clip 10 by providing each wing 28 with an single, permanent pivot point A. The pivot point A is a constant point about which the torsion bar 52 pivots. The pivot point A does not vary in relation to the pressure exerted upon the wings 28. Because the pivot point A is constant, the movement of the wings 28 is also constant and predictable. This predictable and constant wing movement makes the positioning of the clip 10 and the attached window 16 predictable and constant, thus increasing the overall effectiveness of the clip 10 by making installation of the window 16 easier and more accurate.

The use of the torsion bar 52 also increases the robustness of the clip 10. Specifically, use of the torsion bar 52 eliminates the need to stretch or compress the wings at an intermediate point between the stop 60 and the torsion bar 52 to pivot the wings. The rotational movement of the torsion bar 52 is believed to be less stressful on the wings 28 than traditional compression and stretching of the wings, and thus should prolong the useful life of the wings 28.

While the preferred embodiment of the clip 10 has been disclosed, it should be appreciated that other aspects can be employed within the scope of the present invention. For example, while the clip 10 is described above as securing a window panel 16 within a frame 18 of an automobile 14, the clip 10 may be used to retain any type of panel within any type of frame or aperture. Further, while the clip 10 is described above as having two wings 28, it must be realized that the clip 10 may be outfitted with more than two wings 28 to either enhance the coupling of the clip 10 to the frame 18 or to accommodate frames 18 of different sizes. Additionally, the rib 42 may extend along the fourth side surface 40 as long as the rib 42 does not extend entirely across the fourth side surface 40 and still permits the release of adhesive 64 from the recess 44. Further, while the base 24 is illustrated as having the general shape of a rectangle, the base 24 may be of other suitable shapes. Still further, the outer surface 54 of the wings 28 need not be concave. The outer surface 54 may be of any suitable shape to facilitate the installation of the clip 10 within the frame 18 and the bearing surfaces 58 need not be entirely planar, although all of the advantages of the present invention may not be realized. The bearing surfaces 58 may be of any suitable shape to facilitate the retention of the clip 10 within the frame 18. Also, it must be noted that the panel 16 may be a polymeric trim panel or a metallic body panel. Further, a psa tape can be used in place of extruded adhesive 64, the open recess 44 acting as a receptacle for receiving such tape. Finally, if the drawing frame 18 is not pre-formed in the sheet metal 66, the supports 46 may be used to locate an indentation or recess (not shown) within the sheet metal 66. Once the clip 10 is positioned within the indentation or recess, pressure is applied to the clip 10 to puncture the sheet metal 66 and permit contact between the wings 28 and the edge 68. It is intended that the flowing claims cover these and any other departures from the disclosed embodiments that fall within the true spirit of this invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A panel retention device comprising:
   a base having a first surface and a second surface;
   a rib extending from at least a majority but less than an entirety of a periphery of said first surface to define an open recess;
   a support extending from said second surface; and
   at least two panel retaining wings coupled to said support.

2. The panel retention device of claim 1 further comprising a window frame projecting from said second surface of said base.

3. The panel retention device of claim 2 wherein said spacer is attached to said support, there are three of said spacers and three of said supports connected to said base, and there are only two of said wings, one between each adjacent pair of said supports.

4. The panel retention device of claim 1 wherein said wings rotate about a single, common pivot axis located adjacent a distal end of said support, said distal end being opposite said base.

5. The panel retention device of claim 4 wherein said wings rotate about a cylindrical torsion bar bridging between at least two of said supports, said pivot axis defining an enlarged center of said torsion bar.

6. The panel retention device of claim 1 wherein said base has a substantially rectangular peripheral shape defined by four side surfaces, said rib extending from less than four of said side surfaces.

7. The panel retention device of claim 1 wherein said wings are of different lengths.

8. The panel retention device of claim 1 wherein said wings are of substantially identical widths.

9. The panel retention device of claim 1 wherein at least one of said wings includes:
   a substantially planar bearing surface located substantially opposite a distal end of said support, said distal end being opposite said base.

10. The panel retention device of claim 1 wherein at least one of said wings includes a bearing surface and a single window frame abutable stop protruding beyond said bearing surface.

11. The panel retention device of claim 1 wherein each of said wings are comprised of:
    a concave outer surface; and
    a window frame engageable bearing surface.

12. The panel retention device of claim 1 wherein said base, said rib, said support, and said wings are comprised of a single plastic injected molded part.

13. The panel retention device of claim 1 further comprising an adhesive located in said open recess.

14. A panel retention device comprising:
    a base having a first surface and a second surface;
    a rib;
    a support extending from said base;
    at least two panel retaining wings coupled to said support each comprising:
    a) a concave surface adapted to initially contact the panel during installation; and
    b) a substantially planar surface adapted to contact a panel frame.

15. The panel retention device of claim 14, wherein said rib extends from at least a majority of, but less than an entirety of, a periphery of said first surface of said base to define an open recess.

16. The panel retention device of claim 15, further comprising an adhesive located in said open recess.

17. The panel retention device of claim 14, wherein said wings rotate about a single common pivot axis located adjacent a distal end of said support, said distal end being opposite said base.

18. The panel retention device of claim 17, wherein said wings rotate about a cylindrical torsion bar bridging between at least two of said supports, said pivot axis defining an elongated center of said torsion bar.

19. The panel retention device of claim 14, wherein at least one of said wings includes a bearing surface and a single panel frame abutable stop protruding beyond the bearing surface.

20. The panel retention device of claim 19 further comprising a panel frame spacer projecting from said second surface and said base.

* * * * *